United States Patent Office 3,321,839
Patented May 30, 1967

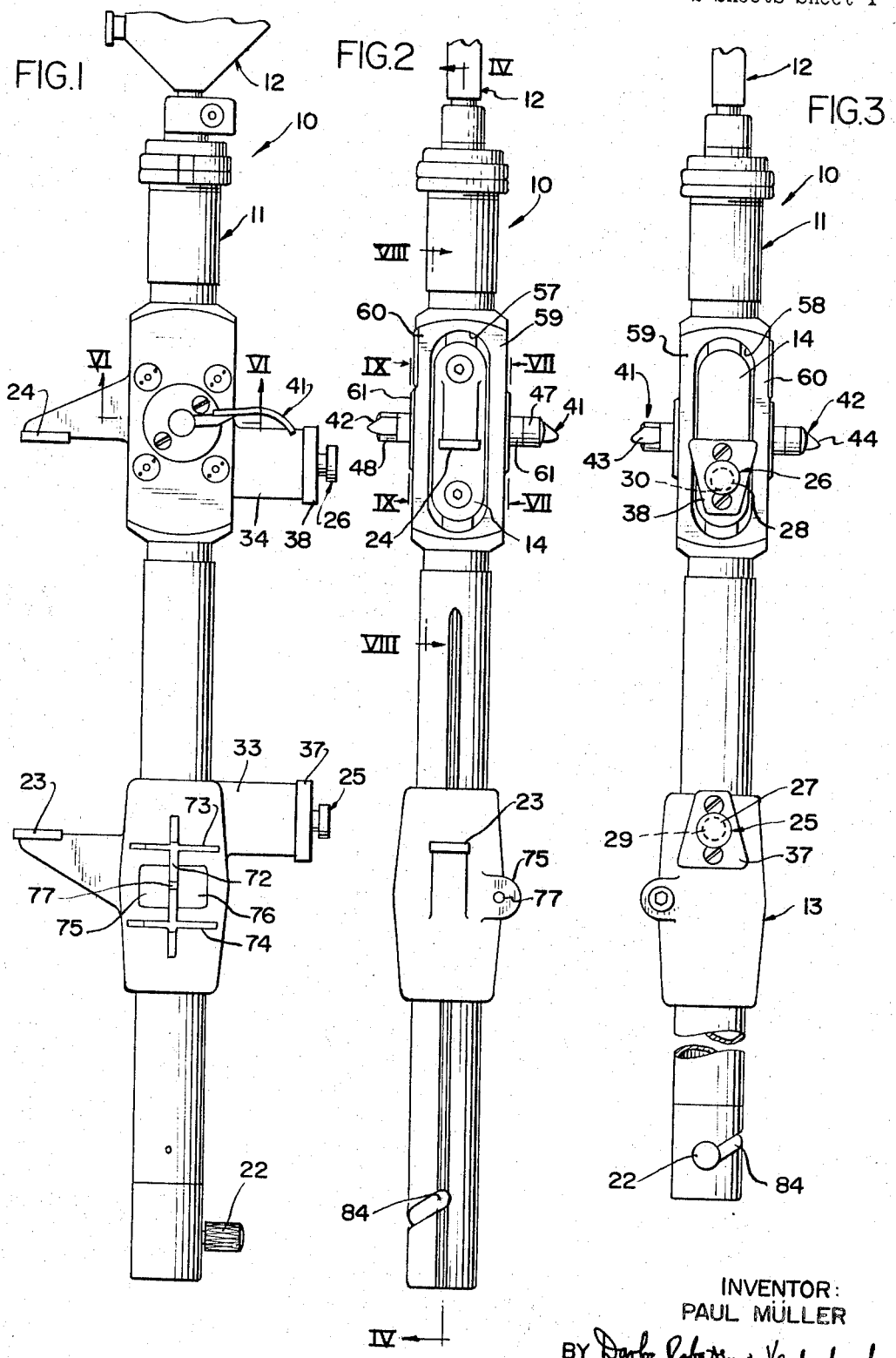

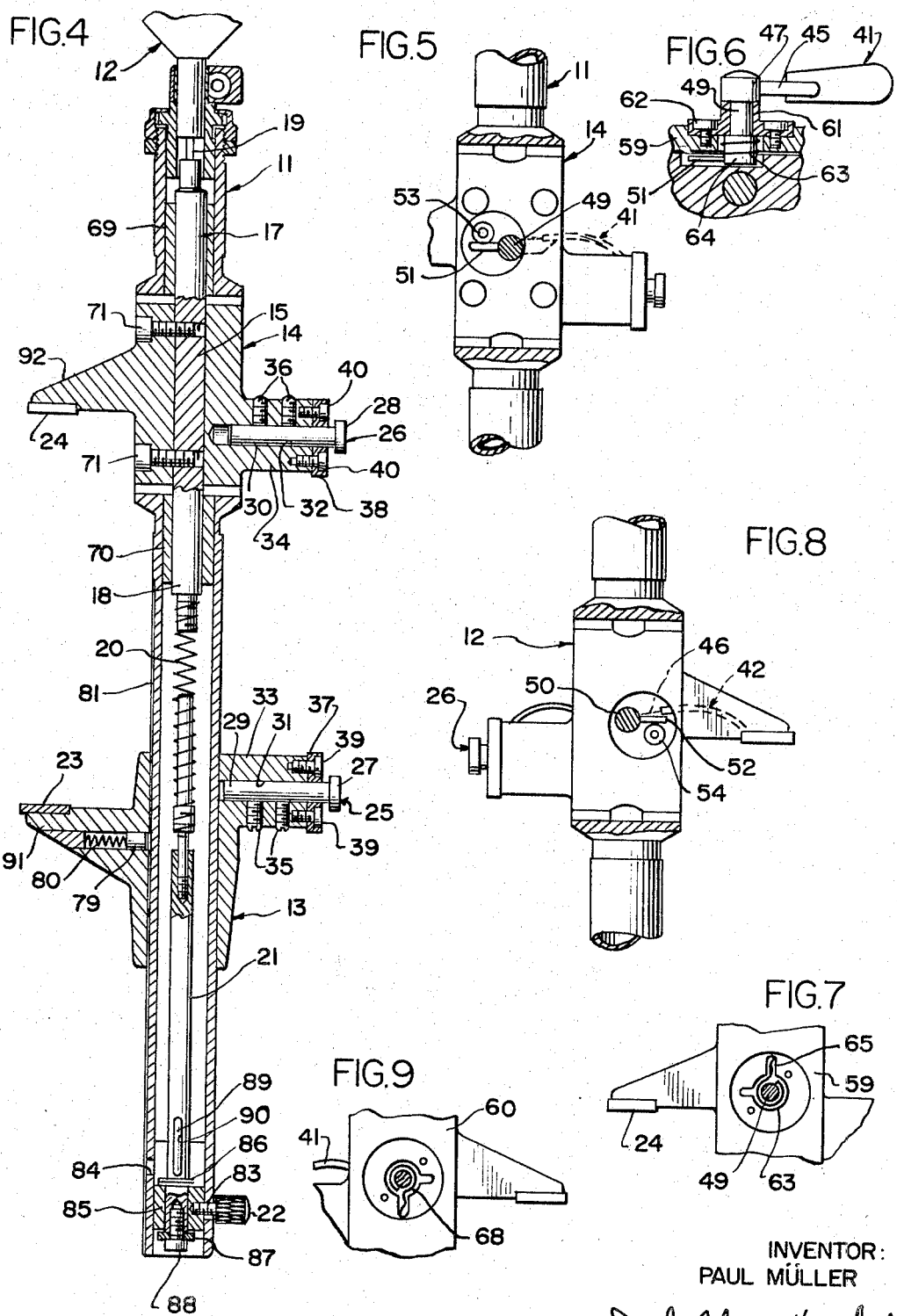

3,321,839
LINEAR MEASUREMENT DEVICE
Paul Müller, Eschweiler, Germany, assignor to
Kordt & Co., Eschweiler, Germany
Filed Mar. 4, 1966, Ser. No. 531,685
Claims priority, application Germany, Oct. 15, 1962,
K 47,973
7 Claims. (Cl. 33—178)

This application is a continuation-in-part of my copending application entitled, "Linear Measurement Device," Ser. No. 315,745, filed Oct. 14, 1963, now Patent No. 3,241,241.

This invention relates to a linear measurement device and more particularly to a device by which inside and outside diameters of parts can be quickly and accurately determined. The device is particularly advantageous in the measurement of the inside diameter of an internal cylindrical opening of a first part and the outside diameter of an external cylindrical surface of a second part which is to be fitted into the first part, to obtain an optimum tightness of fit between the parts.

The above mentioned copending application discloses a device for use with a dial gauge having a feeler pin, wherein caliper elements are carried by a pair of caliper heads one of which is adjustably affixed on a tubular support and the other of which has a portion projecting through a longitudinal slot in the tubular support to means extending longitudinally within the support to operate the feeler pin of the dial gauge. As also disclosed in the aforesaid copending application, the caliper heads carry both a pair of inside caliper elements and a pair of outside caliper elements, so as to be usable to measure both the inside diameter of a cylindrical opening in a first part and the outside diameter of a second part which is to be fitted into the first part.

This application is directed in part to a very important feature which is also disclosed in said copending application. In particular, at least one of the caliper elements is adjustably mounted on its associated head to adjust the position of the caliper surface thereof and to obtain a predetermined difference between the spacing of the caliper surfaces of the inside caliper elements and the spacing of the caliper surfaces of the outside caliper elements. With this feature, the device can be used to check the diameter of the cylindrical opening in a first part with respect to the diameter of an external cylindrical surface of a second part, to obtain a desired or an optimum fit therebetween. For example, if a running fit is desired between a shaft and a borehole, the diameter of the shaft should usually be slightly smaller than that of the borehole, to provide space for a lubricant and to prevent binding action. On the other hand, if a drive fit should be desired between two parts, it is desirable that the diameter of the external cylindrical surface be slightly greater than the diameter of the internal cylindrical surface. With the measurement device of this invention, it is possible to determine the desired difference between diameters very easily and quickly and with a very high degree of accuracy.

According to a further feature of the invention as disclosed and claimed in the aforesaid copending application as well as in this application, means are provided for fixedly locking the caliper element in an adjusted position, so as to permit repeated measurement with a high degree of accuracy and reliability.

As disclosed in the aforesaid copending application, the adjustment is obtained by means of side plates on one head or carrier body, which are provided with adjusting screws, with a bracket which carries one of the inside caliper elements being arranged between the adjusting screws and having slotted holes through which affixing screws extend to screw the bracket to the head or carrier body. With the affixing screws loosened, the bracket can be moved by the adjusting screws relative to the carrier body and can thus be adjusted. The affixing screws can then be tightened to fixedly lock the element in an adjusted position.

The adjustment arrangement as so disclosed in the aforesaid application permits highly accurate adjustment but has disadvantages from the standpoint of the number of parts required and the cost of manufacture.

According to a specific feature of the invention as disclosed in this application, a caliper element is provided having a caliper surface which is curved to extend arcuately about a certain axis, and the element is journaled in its associated supporting element for rotation about an eccentric axis, so as to permit adjustment simply by rotation thereof. Preferably, the element has a generally circular head portion defining the caliper surface thereof and has a shank portion eccentrically related to the head portion and extending into an opening in the associated supporting head. To fixedly lock the caliper element in an adjusted position, one or more set screws are provided for engagement with the shank portion.

Another very important feature of the invention as disclosed in this application is in the provision of manually operable means for acting in opposition to spring means to shift the position of a movable caliper head and to permit positioning of caliper elements in facing relation to diametrically opposite points of a cylindrical surface, with the manually operable means being releasable to allow the spring means to act to effect engagement of the caliper element with the diametrically opposite points. With this arrangement, the caliper elements can be readily positioned without damage thereto, and the measurement operation can be made more quickly and easily.

According to a specific feature of the invention, the manually operable means comprises a spring-urged lever means including a first arm adapted for engagement by a finger of the user and a second arm for acting on a movable caliper head.

According to another specific feature of the invention, a pair of manually operable means are provided, one for use in conjunction with the inside caliper elements and the other for use in conjunction with the outside caliper elements. Preferably, the two manual operable means are in the form of levers disposed on opposite sides of a support element.

It is therefore an object of this invention to provide a linear measurement device by which inside or outside dimensions of parts can be quickly and accurately determined.

A specific object of the invention is to provide a linear measurement device which can be readily adjusted for an accurate comparison of the inside and outside diameters of parts to be interfitted.

Another specific object of the invention is to provide a linear measurement device in which surfaces of caliper elements can be brought into facing relation to portion of a part to be measured and then moved into engagement therewith.

A further object of the invention is to provide a linear measurement device which is simply and economically manufacturable while being highly accurate and rugged and durable.

This invention contemplates more specific objects, features and advantages which will become more fully apparent from the following detailed description taken in conjunction with the accompanying drawings which illustrate a preferred embodiment and in which:

FIGURE 1 is a front elevational view of a linear measurement device constructed in accordance with the principles of this invention;

FIGURE 2 is a side elevational view of the device shown in FIGURE 1;

FIGURE 3 is an opposite side elevational view of the device shown in FIGURE 1;

FIGURE 4 is an elevational sectional view taken substantially along line IV—IV of FIGURE 2;

FIGURE 5 is a sectional view taken substantially along line V—V of FIGURE 2;

FIGURE 6 is a sectional view taken substantially along line VI—VI of FIGURE 1;

FIGURE 7 is a sectional view taken substantially along line VII—VII of FIGURE 2;

FIGURE 8 is a sectional view taken substantially along line VIII—VIII of FIGURE 2; and FIGURE 9 is a sectional view taken substantially along line IX—IX of FIGURE 2.

Reference numeral 10 generally designates a linear measurement device constructed in accordance with the principles of this invention. The device 10 comprises a generally tubular support 11 adapted to support a conventional dial gauge 12 at one end thereof. A first caliper head 13 is adjustably fixed on a tubular support 11. A second caliper head 14 is supported for movement along the tubular support 11 and is connected to a rod 15 within the support 11. The rod 15 has end portions which define guide pins 17 and 18. The end of guide pin 17 is engaged with a feeler pin 19 of the dial gauge 12, while the end of pin 18 is connected through a coiled spring 20 to a piston element 21 the position of which is adjustable axially by a control knob 22 as hereinafter described.

The caliper heads 13 and 14 support a pair of outside caliper elements 23 and 24 and a pair of inside caliper elements 25 and 26. In operation, the position of the caliper head 13 may be adjusted to obtain a zero indication on the dial gauge 12 when a part having a desired outside dimension is disposed between the outside caliper elements 23 and 24 or when the inside caliper elements 25 and 26 are engaged with a part having the desired inside dimension. When measuring outside dimensions, the control knob 22 is moved downwardly to move the piston 21 downwardly and to cause the coil spring 20 to act in tension to move the caliper head 14 toward the caliper head 13. In measuring inside dimensions, the knob 22 is moved upwardly to move the piston rod 21 upwardly and to cause the coil spring 20 to act in compression, so as to urge the caliper head 14 away from the caliper head 13.

According to a very important feature of the invention, the position of the caliper surface of at least one of the caliper elements is adjustable so that a predetermined difference can be obtained between the spacing of the caliper surfaces of the outside caliper elements 23 and 24 and the spacing of the caliper surfaces of the inside caliper elements 25 and 26. In the illustrated device, the positions of the caliper surfaces of both of the inside caliper elements 25 and 26 are adjustable. In particular, the elements 25 and 26 have circular head portions 27 and 28 and have shank portions 29 and 30 journaled in openings 31 and 32 of tubular extensions 33 and 34 of the heads 13 and 14, and the axes of the head portions 27 and 28 are offset or in eccentric relation to the axes of the shank portions 29 and 30, so that by rotation of the elements 25 and 26, it is possible to adjust the distance between the caliper surfaces of the head portions 27 and 28 which are engageable with an internal cylindrical surface.

According to a specific feature, the caliper elements 25 and 26 are fixedly locked in adjusted positions by means of pairs of set screws 35 and 36 which are threaded through walls of the tubular extensions 33 and 34 of the heads 13 and 14 to engage axially spaced portions of the shank portions 29 and 30, to thereby permit repeated measurement with a high degree of accuracy and reliability.

Preferably, hardened face plates 37 and 38 are secured to the outer ends of the generally tubular extensions 33 and 34 of the heads 13 and 14, by means of screws 39 and 40.

Another very important feature of the invention relates to the provision of manually operable means in the form of lever arms 41 and 42 which are engageable by the finger of the user to shift the position of the head 14. When the lever arm 41 is depressed, i.e. moved downwardly as illustrated, the head 14 is moved a predetermined distance away from the head 13, so as to permit positioning of the outside caliper elements 23 and 24 in facing relation to diametrically opposite points of an external cylindrical surface to be measured. The lever arm 41 may then be released whereupon the head 14 is moved toward the head 13 by the spring 20 acting in tension.

The lever arm 42 is used during inside diameter measurements, when the knob 22 is positioned upwardly to cause the spring 20 to act in compression. When the lever arm 42 is depressed, the head 14 is moved a predetermined distance toward the head 13, so as to permit positioning of the inside caliper elements 25 and 26 in facing relation to diametrically opposite points of an internal cylindrical surface to be measured. Upon release of the lever arm 42, the spring 20 moves the head 14 away from the head 13 to engage the caliper elements 25 and 26 with the diametrically opposite points of the surface to be measured. It will be noted that the lever arms 41 and 42 respectively project away from the axis of the tubular support 11 in opposite directions with respect to the outside and inside caliper elements 24 and 26, so as to be positioned for convenient use during the outside and inside measurements.

The lever arms 41 and 42 comprise outer curved plates 43 and 44 for engagement by the finger, which are carried by inner arm portions 45 and 46 from hubs 47 and 48 from the ends of shafts 49 and 50, with arms 51 and 52 on the inner ends of the shafts 49 and 50 being engageable with pins 53 and 54 which project from opposite sides of the head 14.

As shown in FIGURE 5, the arm 51 projects from the axis of shaft 49 in a radial direction which is opposite the radial direction of projection of the corresponding lever arm 41, so that the head 14 is moved away from the head 13 when the outer end of the lever arm 41 is moved toward the head 13. As shown in FIGURE 8, the arm 52 projects from the axis of the shaft 50 in a radial direction which is parallel to the radial direction of projection of the corresponding lever arm 42, so that the head 14 is moved toward the head 13 when the outer end of lever arm 42 is moved toward the head 13.

An intermediate portion of the generally tubular support 11 is formed with slots 57 and 58 through which the head 14 projects to support the outside and inside caliper elements 24 and 26 and is also formed with spaced parallel side wall portions 59 and 60 on opposite sides of the head 14, on which the lever arms 41 and 42 are supported. In particular, as shown in FIGURE 6, the shaft 49 is journaled in a bearing element 61 which is secured by screws 62 to the side wall portion 59. The lever arm 41 is urged to an inactive position by means of a spring element 63 which is coiled around an enlarged portion 64 of the shaft 49, one end of the spring 63 being secured to the portion 64, and the other end thereof being locked in a slot 65 of the side wall portion 59, as shown in FIGURE 7. Similarly, the shaft 50 for the lever arm 42 is journaled in a bearing element 67 on the side wall portion 60, with a spring element 68 being provided to urge the lever arm 42 to an inactive position.

Anti-friction means are provided for journaling the pins 17 and 18 in the tubular support 11. In particular, sleeve bearing elements 69 and 70 are affixed in the tubular support 11, for receiving and journaling the pins 17 and 18.

In assembly, the sleeve bearing elements 69 and 70 may be first affixed in position, after which the head 14 is inserted in position between the side wall portions 59 and 60. The rod 15 may then be inserted through the end of the tubular support 11 to extend through the head 14, screws 71 being then screwed into position to lock the head 14 to the rod 15, so that the pins 17 and 18 are provided, defined by the opposite ends of the rod 15.

To permit adjustment of the position of the head 13, it is provided with a longitudinally extending slot 72 intersected by a pair of longitudinally spaced transverse slots 73 and 74 to provide portions 75 and 76 which can be moved toward each other by a screw 77 to frictionally lock the head 13 in an adjusted position. Rotation of the head 13 is prevented by means of a key element 79 which is urged by a spring 80 into a longitudinally extending keyway 81 in the tubular support 11.

To control actuation of the piston element 21 by the knob 22, a shank portion 83 on the knob 22 extends through a spiral slot 84 in the wall of the tubular housing 11 and is threaded into a collar 85 which is disposed between a flange 86 on the piston element 21 and a washer 87 which is secured by a screw 88 to the end of the piston element 21. A pin 89 extends through a longitudinal slot 90 in the piston element 21 to prevent rotation thereof.

To obtain accurate positioning of the outside caliper elements 23 and 24, they are respectively cemented to projecting portions 91 and 92 by means of an appropriate adhesive. Preferably, the adhesive is applied to the surfaces of the elements 23 and 24 and the portions 91 and 92 and the elements 23 and 24 are placed in position, after which they are brought into contact with opposite surfaces of a gauge block, preferably a quartz block. The adhesive is then allowed to harden, and after the gauge block is removed, the facing surfaces of the caliper elements 23 and 24 are exactly parallel.

It will be understood that modifications and variations may be effected without departing from the spirit and scope of the novel concepts of this invention.

I claim as my invention:

1. In a linear measurement device for measurement of the inside diameter of an internal cylindrical surface of one part and the outside diameter of an external cylindrical surface of a second part, first and second caliper heads supported for relative rectilinear movement, a pair of inside caliper elements respectively projecting from said first and second heads and having caliper surfaces for engagement with diametrically opposite portions of said internal cylindrical surface, and a pair of outside caliper elements respectively projecting from said first and second heads and having caliper surfaces for engagement with diametrically opposite portions of said external cylindrical surface, one of said caliper elements being adjustably mounted on its associated head to adjust the portion of the caliper surface thereof and to obtain a predetermined difference between the spacing of said caliper surfaces of said inside caliper elements and the spacing of said caliper surfaces of said outside caliper elements, said caliper surface of said one of said caliper elements being curved to extend generally arcuately about a certain axis, and said one of said caliper elements being journaled on said associated head for rotation about an axis in eccentric relation to said certain axis.

2. In a device as defined in claim 1, said one of said caliper elements having a generally circular head portion defining said curved caliper surface thereof and having a shank portion eccentrically related to said head portion, and said associated head having an opening receiving and journaling said shank portion.

3. In a linear measurement device for measurement of the inside diameter of an internal cylindrical surface of one part and the outside diameter of an external cylindrical surface of a second part, first and second caliper heads supported for relative rectilinear movement, a pair of inside caliper elements respectively projecting from said first and second heads and having caliper surfaces for engagement with diametrically opposite portions of said internal cylindrical surface, and a pair of outside caliper elements respectively projecting from said first and second heads and having caliper surfaces for engagement with diametrically opposite portions of said external cylindrical surface, one of said caliper elements being adjustably mounted on its associated head to adjust the position of the caliper surface thereof and to obtain a predetermined difference between the spacing of said caliper surfaces of said inside caliper elements and the spacing of said caliper surfaces of said outside caliper elements, a dial gauge having a feeler pin, a tubular support adapted to be secured at one end thereof to the dial gauge and having longitudinal slots therein, means for supporting said first caliper head in a fixed position on said tubular support, said second caliper head extending through said slots to provide a portion within said tubular support, a pair of pin means secured to said second caliper head and extending in opposite directions within said tubular support, one of said pin means being engageable with said feeler pin, anti-friction sleeve bearing means between said pin means and said tubular support for journaling said second caliper head for free movement along said tubular support, spring means acting between said heads and selectively operable for urging said heads either toward or away from each other, said tubular support having a pair of spring-urged manually operable lever means on said wall portions arranged for acting in opposition to said spring means for shifting the position of said second caliper head and to permit positioning of said caliper elements in facing relation to diametrically opposite points of a cylindrical surface, said manually operable lever means being releasable to allow said spring means to act to effect engagement of said caliper elements with said diametrically opposite points.

4. In a linear measurement device, support means, a first caliper head supported in fixed position on said support means, a second caliper head supported for rectilinear movement on said support means, first and second caliper elements projecting from said heads and defining caliper surfaces for engagement with diametrically opposite points of a cylindrical surface, spring means acting between said heads for urging said caliper elements toward said diametrically opposite points, and manually operable means for acting in opposition to said spring means to shift the position of said second caliper head and to permit positioning of said caliper elements in facing relation to said diametrically opposite points of said cylindrical surface, said manually operable means being releasable to allow said spring means to act to effect engagement of said caliper elements with said diametrically opposite points, said device being adapted for measurement of the inside diameter of an internal cylindrical surface and the outside diameter of an external cylindrical surface, said first and second caliper elements being engageable with diametrically opposite points of an internal cylindrical surface, third and fourth caliper elements projecting from said heads for engagement with diametrically opposite points of an external cylindrical surface, means for shifting said spring means to a different position to act between said heads for urging said third and fourth caliper elements toward said diametrically opposite points of said external cylindrical surface, second manually operable means for operating against said spring means in said different position thereof to shift the position of said second caliper head to permit positioning of said third and fourth caliper elements in facing relation to said diametrically opposite points of said external cylindrical surface, said second manually operable means being releasable to allow said spring means to effect engagement of said third and fourth caliper elements with said diametrically opposite points of said external cylindrical surface.

5. In a linear measurement device as defined in claim 4, said first and second manually operable means comprising a pair of depressible spring-urged lever arms on opposite sides of said support means respectively projecting in directions opposite second and fourth caliper elements.

6. In a linear measurement device as defined in claim 5, said first and second caliper elements having generally circular head portions defining said caliper surfaces and having shank portions eccentrically related to said head portions, said first and second heads having openings receiving said shank portions, and set screw means for engaging said shank portions in locking said first and second caliper elements in adjusted positions.

7. In a linear measurement device for measurement of the inside diameter of an internal cylindrical surface of one part and the outside diameter of an external cylindrical surface of a second part, support means, a dial gauge on said support means having a feeler pin, a first caliper head adjustably fixed on said support means, a second caliper head supported for rectilinear movement on said support means toward and away from said first head, means on said second head for engaging said feeler pin, a pair of inside caliper elements respectively projecting from said first and second heads and having caliper surfaces for engagement with diametrically opposite portions of said internal cylindrical surface, a pair of outside caliper elements respectively projecting from said first and second heads and having caliper surfaces for engagement with diametrically opposite portions of said external cylindrical surface, one of said caliper elements being adjustably mounted on its associated head to adjust the position of the caliper surface thereof and to obtain a predetermined difference between the spacing of said caliper surfaces of said inside caliper elements and the spacing of said caliper surfaces of said outside caliper elements at which a predetermined indication is obtained on said dial gauge, and means for fixedly locking said one of said caliper elements in an adjusted position on its associated caliper head.

References Cited
UNITED STATES PATENTS

| | | | |
|---|---|---|---|
| 498,595 | 5/1893 | Wetzel | 33—167 |
| 1,420,700 | 6/1922 | Hoffman | 33—164 |
| 1,516,631 | 11/1924 | D'Erville | 33—143 |
| 1,531,357 | 3/1925 | Tautz | 33—147 |
| 2,467,847 | 4/1949 | Mozur | 33—147 |
| 3,067,520 | 12/1962 | Geraghty | 33—147 |

LEONARD FORMAN, *Primary Examiner.*

SAMUEL S. MATTHEWS, *Examiner.*